May 7, 1968 J. W. E. HANES 3,381,983
CONNECTIBLE AND DISCONNECTIBLE TOOL JOINTS
Filed Aug. 16, 1965 3 Sheets-Sheet 1
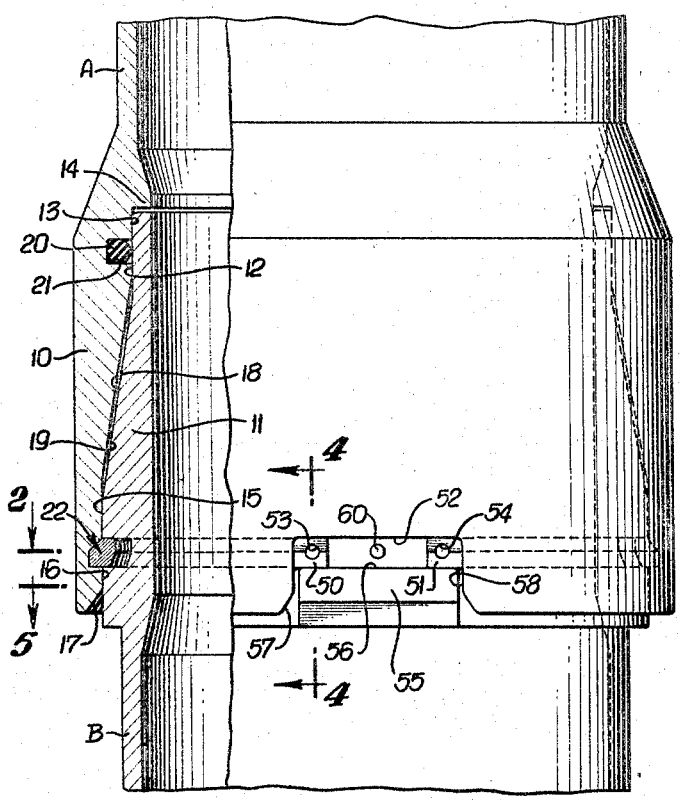
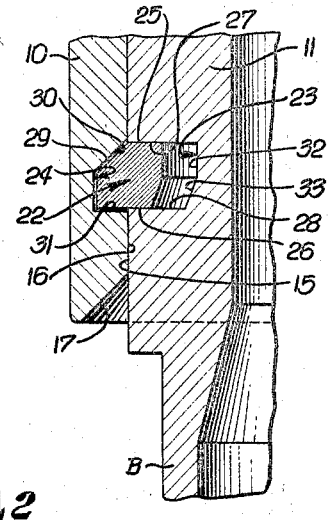
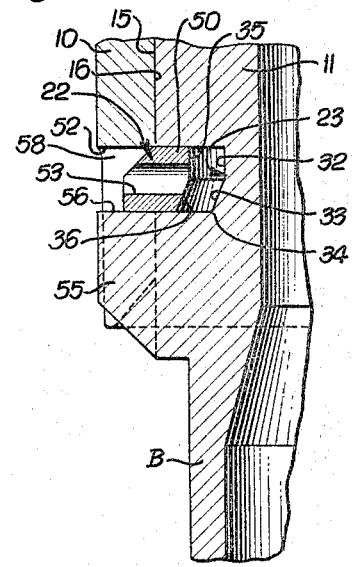
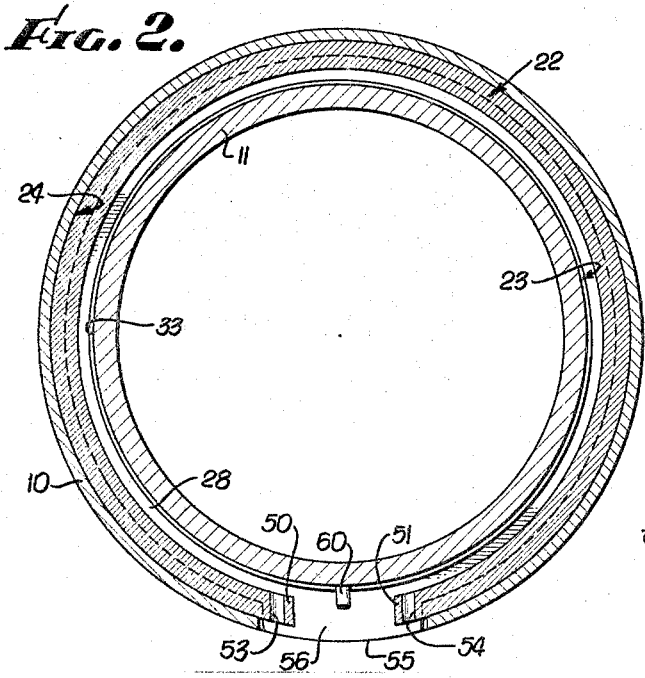
INVENTOR.
JAMES W. E. HANES
By Bernard Kriegel
ATTORNEY.

May 7, 1968 J. W. E. HANES 3,381,983
CONNECTIBLE AND DISCONNECTIBLE TOOL JOINTS
Filed Aug. 16, 1965 3 Sheets-Sheet 2
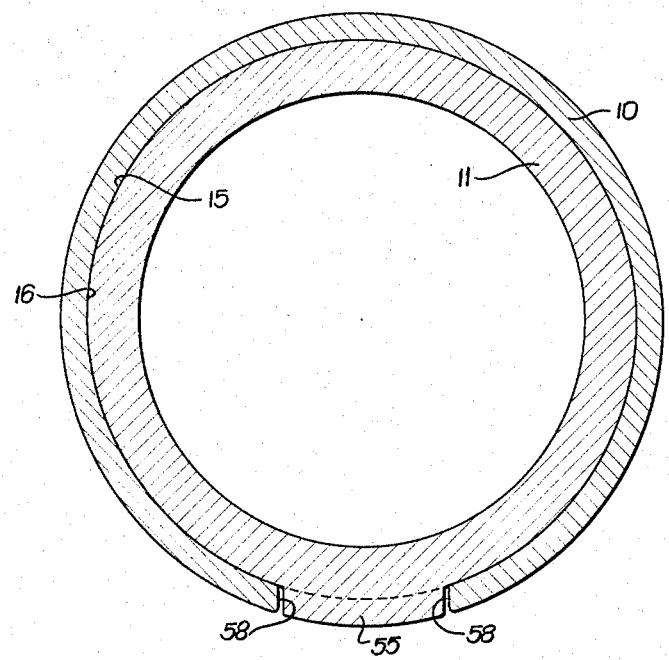
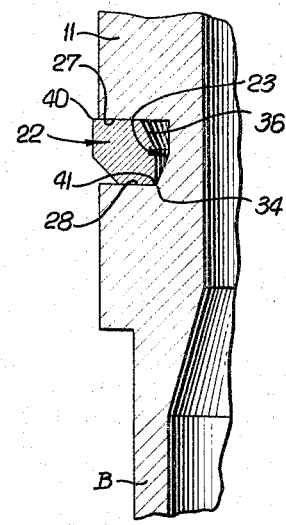
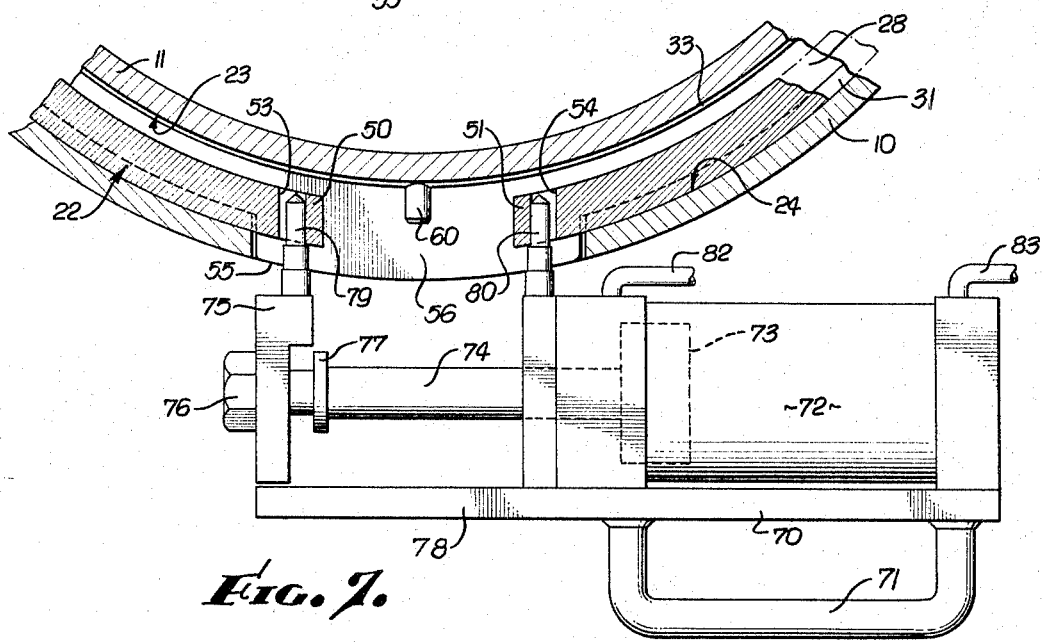
INVENTOR.
JAMES W. E. HANES
By Bernard Kriegel
ATTORNEY.

May 7, 1968 J. W. E. HANES 3,381,983
CONNECTIBLE AND DISCONNECTIBLE TOOL JOINTS
Filed Aug. 16, 1965 3 Sheets-Sheet 3
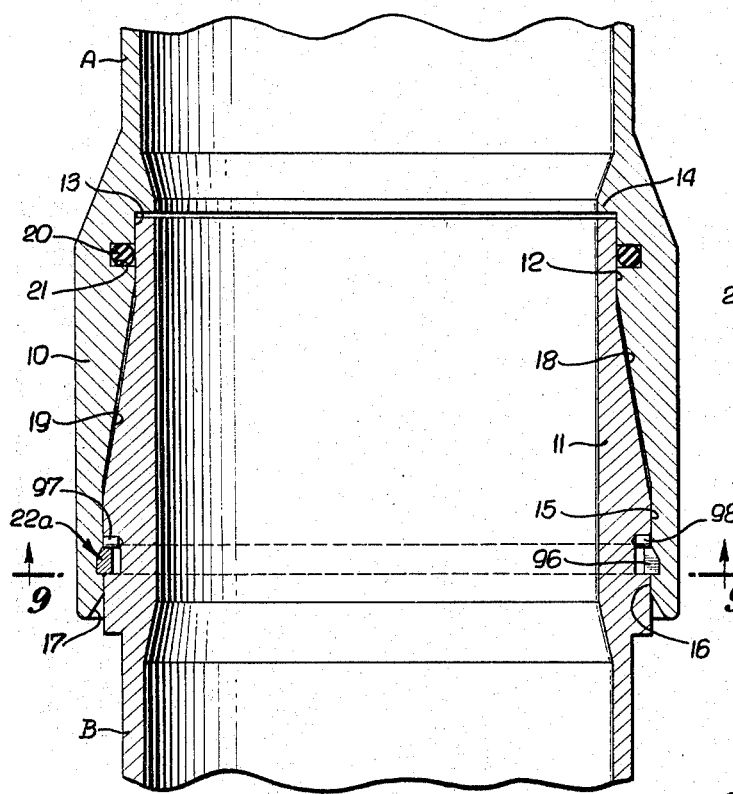
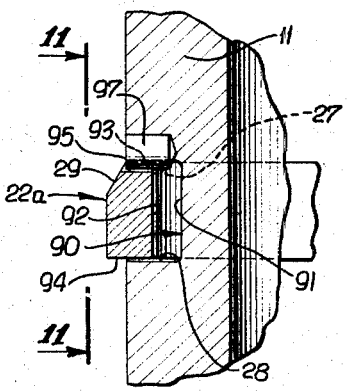
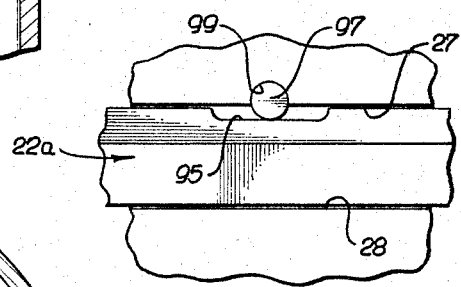
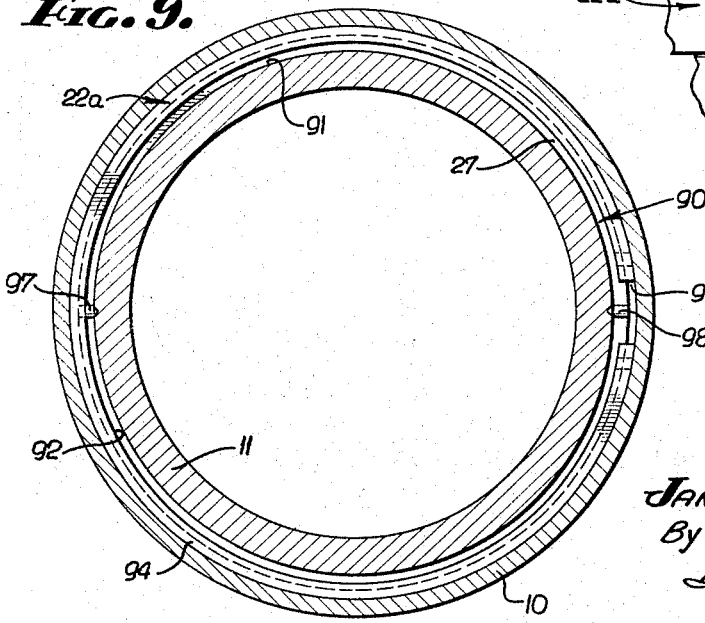
INVENTOR.
JAMES W. E. HANES
By Bernard Kriegel
ATTORNEY.

United States Patent Office 3,381,983
Patented May 7, 1968

3,381,983
CONNECTIBLE AND DISCONNECTIBLE TOOL JOINTS
James W. E. Hanes, Ventura, Calif., assignor to Ventura Tool Company, Ventura, Calif., a corporation of California
Filed Aug. 16, 1965, Ser. No. 479,791
8 Claims. (Cl. 285—321)

ABSTRACT OF THE DISCLOSURE

A tool joint including a pin member receivable in a box member with a split lock ring releasably coupling the members together, the box member having a window exposing the split ends of the ring for access by a releasing tool, the window also receiving a lug for transmitting torque between the members and for retaining the split ends of the ring exposed in the window.

---

The present invention relates to tool joints for connecting pipe sections together, such as pipe sections to be secured to one another for lowering in a well bore.

An object of the invention is to provide a tool joint or connector having pin and box members secured together by a snap or coupling ring, in which the ends of the coupling ring are readily available for effecting disconnection between the members.

Another object of the invention is to provide a tool joint or connector having pin and box members secured together by a snap or coupling ring, in which the members are rotationally oriented with respect to each other so that portions of the coupling ring are accessible for effecting required change in the ring diameter when the members are to be disconnected from each other.

A further object of the invention is to provide a tool joint or connector having pin and box members secured together by a snap or coupling ring, in which torque can be transmitted between the members.

An additional object of the invention is to provide a tool joint or connector having pin and box members secured together by a snap or coupling ring, in which the tool joint cannot be assembled in the event the snap ring is installed incorrectly in its companion groove in one of the members.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIGURE 1 is a longitudinal section and side elevational view of a tool joint or connector embodying the invention;

FIG. 2 is a cross-section taken along the line 2—2 on FIG. 1;

FIG. 3 is an enlarged fragmentary vertical section of a portion of the pin and box member and coupling or snap ring illustrated in FIG. 1;

FIG. 4 is an enlarged section taken along the line 4—4 on FIG. 1;

FIG. 5 is a cross-section taken along the line 5—5 on FIG. 1;

FIG. 6 is a fragmentary section illustrating incorrect mounting of the snap or coupling ring in its associated groove in the inner member of the tool joint illustrated in FIG. 1;

FIG. 7 is an enlarged fragmentary cross-section through the apparatus, illustrating a tool for constricting the split snap or coupling ring, to enable the tool joint members to be disconnected from one another;

FIG. 8 is a longitudinal section through another embodiment of the invention;

FIG. 9 is a cross-section taken along the line 9—9 on FIG. 8;

FIG. 10 is an enlarged section through a portion of the device shown in FIG. 8;

FIG. 11 is a side elevational view taken along the line 11—11 on FIG. 10.

In the specific embodiment of invention illustrated in the drawings, it is desired to connect or couple the lower end of one pipe section A to the upper end of an adjacent pipe section B. An example of use of the invention is in marine conductors in which conductor pipe is to be lowered from a floating vessel (not shown) through a body of water into a well bore (not shown). Each pipe section normally has a lower box portion 10 and an upper pin portion 11, the lower box portion of one section A being adapted to be disposed over the upper pin portion of a pipe section B therebelow. The pin and box portions collectively constitute a tool joint or connector for coupling the pipe sections to one another. The lower box portion 10 has its upper end suitably integrated to the pipe or tubular member A thereabove, as by being welded thereto. Similarly, the lower end of the upper pin portion or member 11 of the tool joint is integrated, as by welding, to the pipe section B therebelow, of which it actually forms a part.

The upper portion of the pin 11 has an outer cylindrical surface or section 12 adapted to fit snugly within an inner cylindrical wall or section 13 at the upper portion of the box 10, this cylindrical surface terminating at an upper box shoulder 14. Similarly, the pin has a lower outer cylindrical surface or section 15, of a substantially greater diameter than its upper cylindrical surface, adapted to fit within a companion inner cylindrical wall or section 16 at the lower entry portion of the box, the lower end of the outer cylindrical surface 16 merging into an outwardly flaring mouth portion 17 constituting the terminus of the box. The pin has an outer tapered wall or section 18 extending from the upper end of its lower cylindrical surface 15 to the lower end of its upper cylindrical surface 12. This tapering wall or section is adapted to fit within and is companion to an inner tapered wall or section 19 which tapers in an upward direction from the upper end of the lower inner cylindrical surface 16 to the lower end of the upper cylindrical surface 13. The distance between the upper end of the upper outer cylindrical surface 12 of the pin and the upper end of the lower outer surface 15 is substantially the same as the distance between the lower end of the inner cylindrical surface 13 within the upper portion of the box and the upper end of its lower inner cylindrical surface 16, so that, when the pin is disposed fully within the box, and with the upper end of the pin substantially abutting the box shoulder 14, the upper and lower outer cylindrical surfaces 12, 15 fit snugly within the upper and lower inner cylindrical surfaces 13, 16, respectively. The distance between the upper and lower cylindrical surfaces is sufficient so that a stiff, stable structure is provided capable of resisting substantial bending loads.

When the pin 11 is inserted fully withing the box 10, its upper outer cylindrical surface 12 engages an elastic seal ring 20, such as a rubber or rubber-like O ring, disposed within an internal groove 21 in the upper portion of the box.

The pin 11 and box 10 are locked to one another against longitudinal separation by a split lock ring 22 that is inherently expandable to a limited extent, and which is disposed within a peripheral groove 23 in the lower portion of the pin 11, this groove extending laterally inwardly from its lower cylindrical surface 15. The lock ring 22 can occupy a contracted position within the groove such that its external diameter is less than the internal diameter of the lower inner cylindrical wall 16 of the box section 10, and it may be expanded outwardly into a companion internal groove 24 in the lower portion of the box section opening laterally inwardly through its lower cylindrical surface 16. This groove 24 has a lateral depth substantially less than the radial thickness of a lock ring, and may, in fact, have a radial depth substantially half that of the lock ring so that when the lock ring is disposed within the internal groove, it is also contained substantially within the external groove 23 of the pin member.

As disclosed, the lock ring 22 has upper and lower surfaces 25, 26 normal to the axis of the pin 11 and slidable along the companion upper and lower walls 27, 28 of its groove 23 in moving laterally therewithin. The upper outer corner 29 of the lock ring is beveled to provide a cam surface tapering in an upward direction and adapted to engage a companion tapered surface 30 constituting the upper side of the inner groove 24 of the box. The lower side 31 of the box groove is normal to the axis of the box, and when the pin 11 is disposed fully within the box 10, as shown in FIG. 1, the lock ring 22 expands partially outwardly of the pin groove and into the box groove to lock or couple the pin and box to one another, with the upper and lower outer cylindrical surfaces 12, 15 of the pin snugly disposed within the upper and lower inner cylinder surfaces 13, 16 of the box, and with the upper end of the pin abutting or closely adjacent to the upper shoulder 14 of the box.

As specifically illustrated in the drawings, the upper and lower sides 27, 28 of the peripheral pin groove are normal to the axis of the pin and parallel to one another. The upper portion 32 of the base of the groove 23 is substantially parallel to the axis of the pin 11, but its lower portion 33 is inclined in a downward and outward direction, providing a lower corner 34 at the point of intersection of the inclined base portion 33 with the lower wall 28 that is disposed radially from the pin axis a greater distance than the upper base portion 32 of the groove. The inner surface of the split lock ring 22 is shaped in a manner to conform to the base 32, 33 of the peripheral groove 23. Thus, its inner surface or wall has an upper portion 35 coextensive in length with the upper portion 32 of the groove base and parallel thereto; whereas, the lower portion 36 of the inner surface of the ring wall is tapered from its upper portion 35 in a downward and outward direction and substantially parallel to the tapered base 33 of the peripheral groove.

The split lock ring 22 and base 32, 33 of the peripheral groove 23 are shaped in the manner just described to prevent the pin and box members 11, 10 from being assembled when the lock ring is inadvertently disposed in an inverted position within the peripheral groove 23. Assuming the lock ring to be properly placed within the peripheral groove 23, it inherently occupies an outer position beyond the periphery of the lower cylindrical wall 15 of the pin member 11, with its tapered cam surface 29 exposed. Upon placing the box member 10 relatively over the pin member 11 and moving it downwardly therealong, the mouth portion 17 of the box will engage the upper tapered cam surface 29 of the split lock ring and contract the latter inwardly within the peripheral pin groove 23 until the ring has an external diameter substantially equalling the internal diameter of the lower inner cylindrical wall 16 of the box member 10, whereupon the box member can slide downwardly along the pin member until its internal groove 24 confronts the split lock ring 22, the latter then inherently expanding outwardly into the internal groove 24 to couple the box and pin members to one another, as shown in FIGS. 1 and 3. The split lock ring 22 can contract sufficiently to allow the lower inner cylindrical wall 16 of the box member to move along the external periphery of the ring, since the shape of the base 32, 33 of the peripheral groove 23 of the pin and the inner surface 35, 36 of the lock ring allow full contraction of the lock ring within the external groove.

In the event the split lock ring 22 is improvidently mounted in the peripheral groove, as in the inverted position, it will normally occupy a position projecting partially beyond the periphery of the lower cylindrical surface 15 of the pin member 11. Upon moving the box portion 10 along the pin portion 11, the flaring mouth 17 will engage the upper outer corner 40 of the inverted ring and shift the ring inwardly within the external groove 23. However, the lower corner 41 of the inverted ring will engage the lower corner 34 of the groove 23, which will limit the extent of inward contraction of the ring. As disclosed in FIG. 6, the upper corner portion 40 of the inverted ring will still project out of the peripheral groove 23 laterally beyond the periphery of the lower cylindrical wall 15 of the pin member. The effective diameter of the outer surface of the ring 23 is then greater than the diameter of the lower inner cylindrical wall 16 of the box member, preventing further downward movement of the box member 10 over the pin portion 11. Accordingly, it will be impossible to couple the box member to the pin member, until the box member is removed and the split lock or snap ring 22 also removed from the peripheral groove 23 and placed therein in its proper position, such as illustrated in FIGS. 1 and 3.

It is also desired to enable the pin and box members 11, 10 to be disconnected from one another in a facile and rapid manner. Accordingly, the end portions 50, 51 of the lock ring on opposite sides of its split are exposed by providing a window or indexing slot 52 in the lower portion of the box 10, extending upwardly from its lower end to a position at the upper end of its internal groove 24. The window or slot 52 has an arcuate extent as to insure the simultaneous exposure of the opposed end portions 50, 51 of the lock ring and of holes 53, 54 provided therein for reception of tool elements described hereinbelow. As assurance that the end portions 50, 51 of the lock ring and their holes 53, 54 will be located within the embrasure of the window 52, a definite arcuate relationship between the pin and box members is provided by an indexing lug 55 on the pin member having an arcuate extent conforming to the arcuate extent of the window or slot 52 and which will extend upwardly within the window, but with its upper surface 56 lying in the plane of the lower side 28 of the internal groove 23, so that the ends 50, 51 of the lock ring will be disposed above the indexing lug 55 when the pin and box members 11, 10 are coupled to one another by the coupling ring 22. To facilitate entry of the indexing lug 55 within the window 52, the lower portions 57 of the sides 58 of the window or indexing slot are inclined in a downward and outward direction, serving as a guide in placing the box member 10 fully over pin member 11.

As assurance that at least one of the holes 53, 54 will always be located within the window 52, in the event of rotation of the ring 22 within the grooves 23, 24, a locating and limit pin 60 is secured to the base portion of the pin member groove 23, which extends radially outwardly between the opposed ends 50, 51 of the lock ring. The distance between the ends of the lock ring, when it is expanded outwardly into the internal groove in the box member, is such that both holes 53, 54 are disposed in alignment with the window 52 when the ring is centered with respect thereto. Turning of the ring 22 within the internal groove 24 will be limited by engagement of an end 50 or 51 with the locating pin 60 which will limit the extent of arcuate shifting of the ring within such groove and insure that at least one end is within the window opening.

The indexing lug 55 and window or indexing slot 52 not only serve to appropriately orient or align the window with respect to the end portions 50, 51 of the lock ring and the locating or limit pin 60, but they also permit torque to be transmitted through the tool joint or connector 10, 11. Thus, the application of torque to the upper pipe section A and its box portion 10 will cause one of the sides 58 of the window to engage the adjacent side of the indexing lug 55 and transmit the torque to the pin member 11 and to the pipe section B of which it forms a part. Such torque transmission will occur with turning effort in a clockwise direction and also in a counterclockwise direction.

The tool joint members are assembled to one another merely by moving the box portion 10 longitudinally over the pin portion 11, and with the window 52 aligned with the indexing lug 55, the flaring mouth portion 17 engaging the split lock ring 22 and shifting it inwardly within the pin groove 23 until the cylindrical wall 16 of the box member rides past the lock ring sufficiently to bring its inner internal groove 24 in alignment with the lock ring, the latter then expanding outwardly into the internal groove to couple the box portion 10 and pin portion 11 to one another, the parts then being in the position illustrated in FIGS. 1 to 5, inclusive.

If it is desired to disconnect the elements 10, 11 of the tool joint from one another, a suitable tool can be placed within the holes 53, 54 in the end portions of the lock ring, and such end portions 50, 51 drawn toward one another to contract the ring within the peripheral groove 23 of the pin member and fully out of the internal groove 24 of the box member, which then allows the box member 10 to be shifted longitudinally from the pin member 11. The locating pin 60 will insure that at least one of the holes 53, 54 in the lock ring is accessible through the window or indexing slot 52. If the lock ring has turned so that one of the holes is out of the window area, then the ring 23 can be turned within the box groove 24 to a position in which both holes 53, 54 are exposed.

As stated above, a suitable tool can be used for constricting the lock or snap ring ring 22 when disconnection of the tool joint or connector is required. One such tool is illustrated in FIG. 7, in which a frame 70 is provided having a handle 71. A cylinder 72 is secured to the frame which has a piston 73 reciprocable therein, a piston rod 74 being secured to the piston and extending outwardly of the cylinder. A yoke 75 is mounted on the rod, the yoke being movable longitudinally by the rod through engagement of either a head 76 on the end of the piston rod with one side of the yoke or by engagement of a collar 77 fixed to the rod with the other side of the yoke. The yoke is guided in its movement along a guide plate 78 which may form a portion of the frame of the apparatus.

A pin 80 is secured to the cylinder and extends laterally therefrom. A corresponding pin 79 is secured to the yoke and extends laterally therefrom. These pins are of a sufficient length as to extend through the window 52, and have an appropriate diameter as to fit within the holes 53, 54 in the end portions 50, 51 of the lock ring 22.

In the use of the retracting or squeeze tool disclosed in FIG. 7, the pins 79, 80 are inserted in the holes 53, 54 in the lock ring 22 and fluid under pressure, such as compressed air, is fed into the rod end of the cylinder through a suitable line 82 to shift the piston 73 toward the head end of the cylinder, and in so doing, causing the rod head 76 to engage the yoke 75 and shift the left end 50 of the ring, as disclosed in FIG. 7, toward the right end 51 of the ring, contracting it within the peripheral groove 23 and completely from the internal groove 24, whereupon longitudinal separation between the box member 10 and pin member 11 can be obtained. If desired, a fluid pressure line 83, such as a compressed air line, can be connected to the head end of the cylinder, to move the piston 73 in the opposite direction when appropriate spacing between the pins 79, 80 is desired prior to their insertion within the lock ring holes 53, 54.

The specific retracting or squeeze tool disclosed in FIG. 7 is for the purpose of illustration. Any suitable tool can be used for contracting the ring 22 in effecting disassembly of the tool joint members 10, 11 from one another.

Another specific device for preventing inadvertent disposition of the split lock ring 22 in its companion groove is illustrated in FIGS. 8 to 11, inclusive. In lieu of providing a specially shaped base of the external or peripheral groove 23, such groove 90 may be made with its base 91 parallel to the axis of the pin 11 or normal to the upper and lower sides 27, 28 of the groove. Similarly, the inner surface 92 of the ring may be made normal to its upper and lower sides 93, 94 or parallel to the base 91 of the groove. In other words, no special shape of the base of the groove or inner surface of the ring is necessary, as in the other embodiment of the invention.

One side of the ring 22a, such as its upper side 93, has a recess 95 provided therein which may be placed diametrically opposite the ring split 96. This recess 95 may be shallow and is adapted to receive one of a pair of diametrically opposite pins 97, 98 that are mounted in the pin portion 11 of the tool joint and extending partially downwardly into its groove 90. Thus, each cylindrical pin 97, 98 is fastened within a companion socket 99 provided in the pin portion 11, the pin 97 or 98 having a diameter such that it projects downwardly within the groove 90, the extent of projection, however, being slightly less than the depth of the recess 95 formed in the split lock ring 22a. As disclosed more specifically in the drawings, each socket 99 has its axis radial of the pin portion 11 of the tool joint and of a curvature conforming to the diameter of the pin 97, 98. Since the pins 97, 98 are disposed in the sockets on diametrically opposite sides of the pin portion 11 of the tool joint, one pin, such as 97, can move relatively within the lock ring recess 95 while the other pin, such as 98, is disposed within the spaced portion constituting the split 96 between the confronting ends of the lock ring.

The height of the lock ring 22a corresponds to the height of the groove 90. If an attempt were made to insert the lock ring in an inverted position within the groove, such insertion could not take place since the inner surface 92 of the ring 22a at its side opposite the beveled corner 29 would engage at least one of the pins 97 or 98 projecting into the groove 90. The ring 22a may be so located, when in an inverted position, that one of the pins 97 or 98 would be received in its split portion 96, but the inner surface 92 of its opposite portion removed from its beveled corner 29 would engage the other pin and prevent mounting of the ring 22a in the groove 90, and would advise the operator that assembly of the ring cannot take place. Accordingly, the ring would be placed in its appropriate position with its split portion 96 aligned with one of the pins, as the pin 98, whereupon the ring can move into the groove 90, since the recess 95 opposite the split 96 could then receive the opposite pin, as the pin 97.

I claim:

1. In a tool joint for connecting pipe sections together: a box member having an internal circumferential groove; a pin member receivable in said box member and having an external circumferential groove; an expandable and contractable split lock ring in one of said grooves shiftable laterally into the other of said grooves to lock said members together against relative longitudinal movement; said box member having an opening through its wall extending longitudinally from an end of said box member and providing access to said ring at its split for lateral removal of said ring from said other of said grooves; and a lug immovably carried by said pin member and having a planar upper surface normal to the axis of said pin member and at least one axially extending surface disposed parallel to a cooperating axial surface defining a side of said opening for the transmission of torque therebetween, said upper surface of said lug being disposed no higher than the plane defining the lower wall surface of said ring receiving groove, the surface forming the bottom of said box member opening extending axially inwardly from the terminal end of said box member a distance at least sufficient to expose a major portion of the axial width of said ring when the pin member and box member are in coupled relation.

2. In a tool joint for connecting pipe sections together as defined in claim 1; wherein said lock ring is in said external circumferential groove and expands into said internal circumferential groove; cam means on said lock ring engageable by said box member to cause said box member to contract said ring fully within said external groove and allow full insertion of said pin member in said box member and partial shifting of said ring into said internal groove.

3. In a tool joint for connecting pipe sections together as defined in claim 1; means on said pin member extending into said pin opening and aligned with said lug and engageable with an end of said ring at its split to limit turning of said ring on said pin member and retain at least one end of said ring at its split confronting said opening.

4. In a tool joint for connecting pipe sections together as defined in claim 2; and means on said pin member extending into said opening and aligned with said lug and engageable with an end of said ring at its split to limit turning of said ring on said pin member and retain at least one end of said ring at its split confronting said opening.

5. In a tool joint: a box member having an internal circumferential groove; a pin member receivable in said box member and having an external circumferential groove; an expandable and contractable lock ring in said external groove expandable partially from said external groove into said internal groove to lock said members together against relative longitudinal movement; cam means on said ring engageable by said box member to cause said box member to contract said ring fully within said external groove and allow full insertion of said pin member in said box member and partial shifting of said ring into said internal groove; limit means on said pin member engaging said ring to prevent its full contraction into said external groove in the event of inverted mounting of said ring in said external groove to prevent full reception of said pin member in said box member; said limit means and ring being non-engageable in the event of upright mounting of said ring in said external groove to permit full reception of said pin member in said box member.

6. In a tool joint for connecting pipe sections together as defined in claim 5; a side of said internal groove remote from an end of said box member being tapered, said limit means being provided by the base of said pin groove including a first portion of shallower depth than an adjacent second portion, said ring having a tapered portion conforming to the tapered side of said internal groove, the inner surface of said ring having a first portion conforming to the first portion of said base and a second portion conforming to the second portion of said base, whereby said ring can contract fully within said external groove when properly mounted in said external groove in an upright position, and wherein said second portion of said ring will engage said first portion of said base to prevent full contraction of said ring in said external groove in the event said ring is mounted in an inverted position in said external groove to prevent full reception of said pin member in said box member.

7. In a tool joint as defined in claim 5; said limit means comprising a pin fixed to said pin member and extending axially into said external circumferential groove, said lock ring having a radial recess therein receiving said pin.

8. In a tool joint as defined in claim 5; said lock ring having a split; said limit means comprising substantially diametrically opposite pins fixed to said pin member and both extending axially in the same direction into said external circumferential groove, one of said pins projecting into said split, said lock ring having a radial recess receiving the other of said pins.

References Cited

UNITED STATES PATENTS

| | | | |
|---|---|---|---|
| 2,417,195 | 3/1947 | Hargreares | 285—330 |
| 2,877,732 | 3/1959 | Eaton | 285—321 |
| 2,997,317 | 8/1961 | Scott | 285—397 |
| 3,104,905 | 9/1963 | Erdmann et al. | 285—321 |
| 3,207,535 | 9/1965 | Wilson | 285—321 |
| 3,278,205 | 10/1966 | Barlow | 285—330 |
| 3,287,032 | 11/1966 | Kraybill | 285—330 |

CARL W. TOMLIN, *Primary Examiner.*

WAYNE L. SHEDD, *Assistant Examiner.*